United States Patent [19]

Grubb

[11] Patent Number: 5,473,622

[45] Date of Patent: Dec. 5, 1995

[54] CLADDING-PUMPED MOPA STRUCTURE

[75] Inventor: Stephen G. Grubb, Warren, N.J.

[73] Assignee: AT&T Corp., Murray Hill, N.J.

[21] Appl. No.: 366,165

[22] Filed: Dec. 29, 1994

[51] Int. Cl.$^6$ ........................................................ H01S 3/30
[52] U.S. Cl. ................................... 372/6; 372/92; 372/69;
372/102; 372/41; 372/39
[58] Field of Search ................................. 372/6, 92, 69,
372/88, 102, 41, 39, 99, 108

[56] References Cited

U.S. PATENT DOCUMENTS

| | | |
|---|---|---|
| 4,815,079 | 3/1989 | Snitzer et al. . |
| 5,268,910 | 12/1993 | Huber .................................. 372/102 |
| 5,305,335 | 4/1994 | Ball et al. ............................... 372/102 |
| 5,317,576 | 3/1994 | Leonberger et al. .................... 372/6 |
| 5,323,404 | 6/1994 | Grubb . |

OTHER PUBLICATIONS

Erdogan, T., and Mizrahi, V., "Fiber Phase Gratings Reflect Advances in Lightwave Technology," Rprinted from the Feb. 1994 edition of Laser Focus World, 4 pages.

*Primary Examiner*—Leon Scott, Jr.

[57] ABSTRACT

A master oscillator and power amplifier configuration for a high power cladding-pumped laser structure, and a method of making same, is disclosed. The laser structure comprises a single mode core having at least one oscillator defined therein, and a first and second cladding layer for waveguiding and radiation retention. The core is doped with refractive-index modifying dopants, in addition to ionized rare earth elements. The refractive-index modifying dopants facilitate writing one or more spaced pairs of index gratings in the core, each pair defining an oscillator. Oscillator cavity length is determined by the desired mode spacing and is less than one-half of the single mode core length. The index gratings are formed via a ultraviolet light-induced refractive index change in the core, which index change varies periodically along the core. The periodic variation is created by projecting an interference pattern on the core.

20 Claims, 2 Drawing Sheets

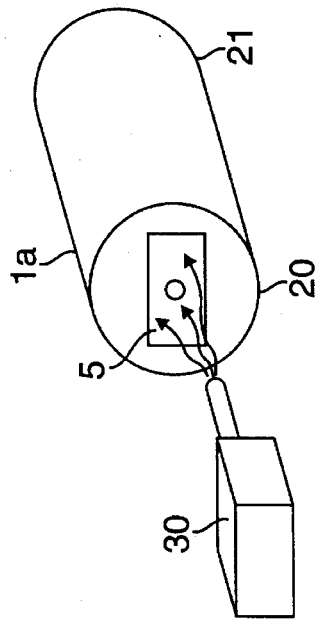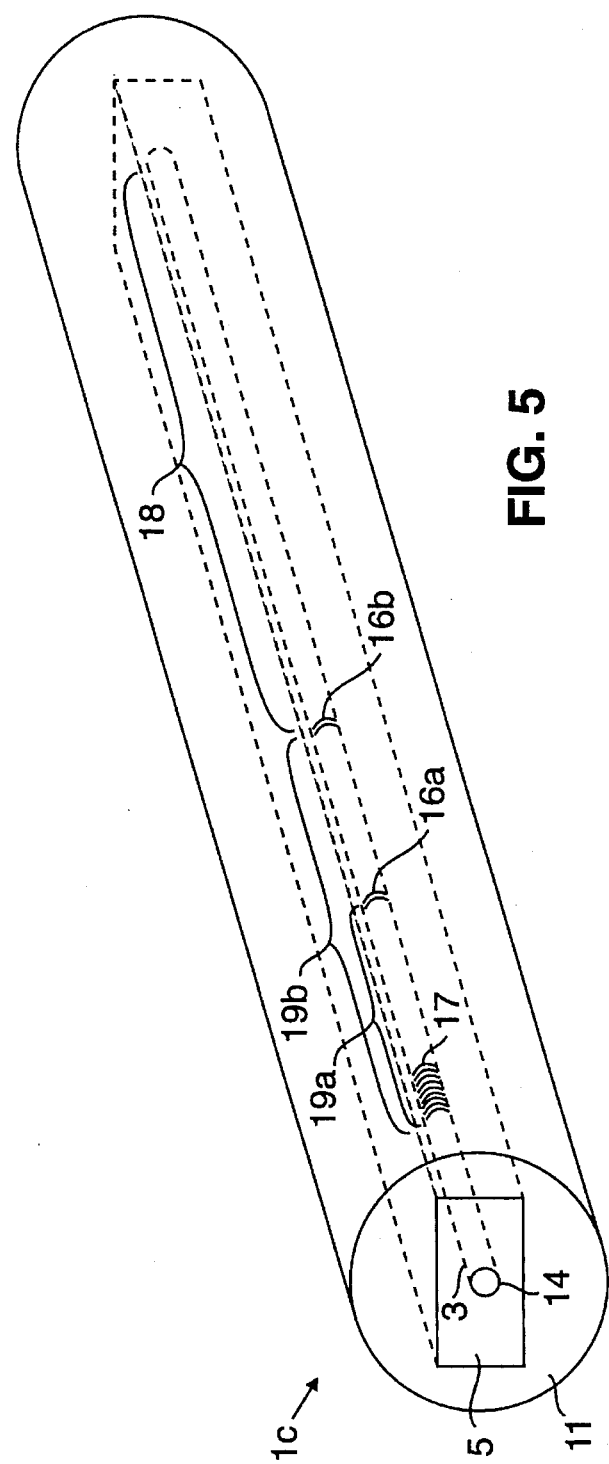

CLADDING-PUMPED MOPA STRUCTURE

FIELD OF THE INVENTION

This invention relates to high power cladding-pumped lasers, and more particularly to an integrated oscillator and amplifier configuration for a high power cladding-pumped laser.

BACKGROUND OF THE INVENTION

A cladding-pumped fiber laser typically comprises a single-mode fiber core disposed within a relatively large multimode cladding. The cladding is surrounded by a further layer to prevent radiation from propagating out of the cladding. The fiber is positioned between two mirrors adjacent to its end faces which define the laser cavity.

Light from a pump laser, such as a laser diode, is injected into the end or the side of the cladding. The geometry and refractive indices of the core and cladding arrangement are such that a substantial amount of the radiation propagating in the cladding is coupled into the single mode core. This is advantageous since radiation can be coupled into the multimode cladding without the high tolerances typically required for coupling light directly into a single mode core. See, Senior, *Optical Fiber Communications: Principles and Practice*, (2d. ed., Prentice Hall, 1992), pp. 347–349. This reference, as well as all others mentioned in this specification, are incorporated herein by reference.

The core is doped with ionized rare-earth elements, which are the active lasing elements. The active lasing elements absorb photons delivered by the pump laser. Photons are then emitted by the active lasing elements at a wavelength characteristic of the particular dopant species.

Presently existing high power cladding-pumped fiber lasers are typically 15 to 60 meters in length. Such lengths are required for full absorption of pump laser power. For high-power transmission, the laser exhibits a number of longitudinal operating modes. The prior art high power cladding-pumped lasers suffer from a number of drawbacks related to their length and the plurality of longitudinal modes operating, as discussed below.

One such drawback is a phenomena known as mode beating noise. Mode beating noise results from the mixing of the numerous longitudinal operating modes. It is desirable to limit the frequency range in which such noise occurs to frequencies above 500 MHz. To do so requires a laser oscillator about 20 cm in length, much shorter than the typical 15–60 meter cavity.

Further, to transmit high power without Stimulated Brillioun Scattering (SBS) occurring, it is desirable to have the plurality of laser modes spaced by 25 MHz or greater. This corresponds to a cavity length of 4 meters or less, again, significantly shorter than the currently available 15–60 meter cladding-pumped fiber lasers.

The relatively long prior art cladding-pumped fiber lasers typically have weak output couplers. These weak output couplers typically have an output reflectivity, R, of about 4 percent, which makes them sensitive to feedback from other sources. A short oscillator with a much more highly reflecting output coupler, such as one having an R greater than 50% and as high as 90%, should be much less feedback sensitive.

High gain cladding-pumped fiber lasers tend to readily self mode-lock, or at least experience a significant amount of round-trip noise. The frequency of the noise may be controlled by varying the cavity length of the oscillator. While the exact mechanism of mode locking is not known, the amount of birefringence or polarization rotation in a long cavity may be play an role in causing the phenoma. A short oscillator cavity should significantly reduce these effects, and hence the tendency to mode-lock.

Typical cladding-pumped fiber lasers have a limited operating wavelength range. The wavelength of operation of a quasi-three level laser such as $Yb^{3+}$ is a function of the amount of inversion averaged over the entire laser length. If a short laser oscillator is located at the highly-pumped front end, the amount of inversion is higher and the laser can therefore operate at shorter wavelengths closer to the three-level transition. This would extend the range of wavelengths available from cladding-pumped fiber lasers.

Thus, there is a need for an improved cladding-pumped laser structure which addresses the aforementioned shortcomings.

SUMMARY OF THE INVENTION

A master-oscillator power amplifier (MOPA) configuration for a cladding-pump laser is disclosed. The MOPA configuration functionally segrates the prior art cladding-pumped laser into two sections, an oscillator section and an amplification section. Specifically, the MOPA configuration may suitably comprise incorporating an oscillator in the single mode core of a cladding pumped fiber laser. The oscillator is defined by a pair of frequency selective index gratings. Upon exiting the oscillator, light is amplified in the amplification section of the MOPA configuration.

Decoupling the length of the oscillator cavity from the length of the amplification facilitates using a suitably short oscillator which substantially minimizes the aforementioned problems resulting in improved laser/amplifier performance.

In one embodiment, a single oscillator is formed in a portion of the fiber core. In additional embodiments, a plurality of oscillators are incorporated in the fiber core.

BRIEF DESCRIPTION OF THE DRAWINGS

Further features of the invention will become apparent from the following detailed description of specific embodiments thereof when read in conjunction with the accompanying drawings wherein:

FIG. 3 shows a pump laser optically coupled to a cladding-pumped MOPA laser structure according to the present invention;

FIG. 5 is a third embodiment of a cladding-pumped MOPA laser structure according to the present invention.

DETAILED DESCRIPTION

Figure 1:
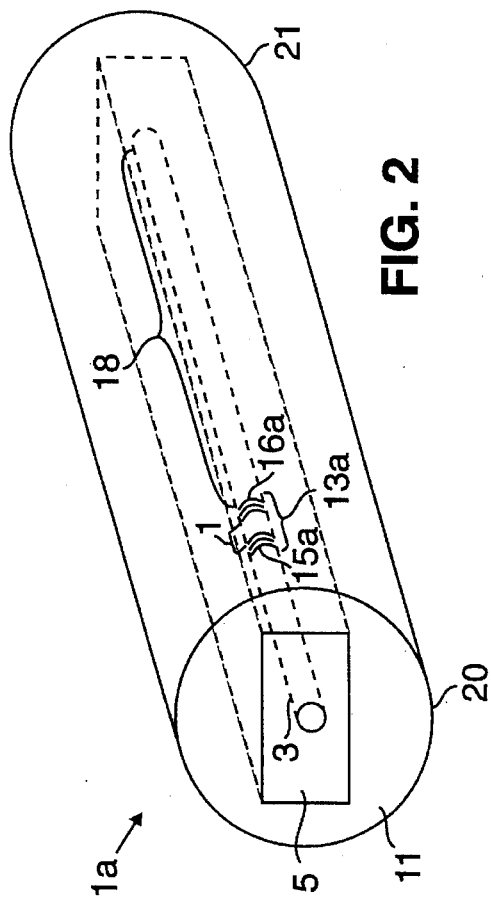
FIG. 1 shows a cross-section of a cladding-pumped MOPA laser structure according to the present invention.

A cross-section of a first embodiment of a cladding-pumped MOPA laser structure 1a according to the present invention is shown in FIG. 1. The laser structure 1a comprises a single mode core 3, a first cladding 5 surrounding the single mode core 3, and a second cladding 11 surrounding the first cladding 5.

Figure 2:
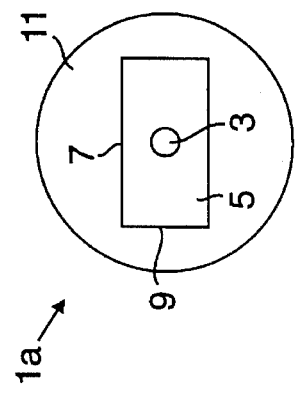
FIG. 2 shows a side-view of an embodiment of a cladding-pumped MOPA laser structure according to the present invention.

As shown in FIG. 2, an oscillator 13a is defined in the core 3. The oscillator 13a is comprised of two index gratings 15a and 15b. The index gratings 15a, 15b are regions of the core 3 wherein the refractive index of the core 3 varies periodically. As discussed below, other embodiments of a cladding-pumped MOPA laser structure may have more than one oscillator defined in the core 3.

The region of the core 3 between the oscillator 13a and an end 21 of the laser structure defines the amplification section 18.

The core 3, which is typically 4–8 microns in diameter, is doped with rare earth ions such as $Nd^{3+}$, $Yb^{3+}$ and $Tm^{3+}$. Such rare earth ions are the active laser elements, and, as such, dictate the operating wavelength of the laser structure 1. The core 3 is made of glass, preferably silica, although other types of glass are acceptable.

In addition to the rare-earth dopants, the core 3 is also doped with elements which modify its refractive index. Such index-modifying dopants are required for forming the index gratings, such as index gratings 15a and 16a. Typical index-modifying dopants include, without limitation, germania, typically as $GeO_2$ or $GeCl_4$, phosphorous, typically as $P_2O_5$ and alumina as $Al_2O_5$. The index of refraction of the doped core 3 is typically 1.465, and may range from about 1.46 to about 1.48.

The first cladding 5 that surrounds the core 3 has a rectangular cross section. The ratio of the lengths of the long sides 7 to the short sides 9 of this rectangular cross section may vary from about 1.5/1 to 10/1. Preferably, the long sides 7 are about three times the length of the short sides 9. In particular, the long sides 7 are typically about 360 microns in length and the short sides 9 are about 120 microns in length.

The first cladding 5 is made of pure silica. It is not doped. The index of refraction of the first cladding 5 is about 1.46 when the index of refraction of the core 3 is about 1.465. A difference in the index of refraction between the core 3 and the first cladding 5 must be maintained to ensure proper waveguiding.

The second cladding 11 encloses the first cladding 5. The second cladding 11 has a circular cross section and is formed from a suitable polymer, such as a fluoropolymer, or a low index glass. The index of refraction of the second cladding 11 is about 1.38 or less.

As previously noted, the cladding pumped MOPA laser structure according to the present invention includes at least one oscillator defined by two index gratings, such as oscillator 13a and index gratings 15a and 16a of FIG. 2. The index gratings, such as index gratings 15a and 16a, function as mirrors with frequency-dependent reflectivities.

The spacing between two index gratings is referred to as the oscillator cavity length L. The oscillator cavity length L may vary from about one centimeter to 30 meters, depending upon the desired laser characteristics. Typically, the oscillator cavity length will be substantially less than one-half the length of the laser structure 1a. In other words, the oscillator, such as oscillator 13a, will be much shorter than the amplification section 18.

The present invention is directed to high power fiber laser applications. As will be appreciated by those skilled in the art, a maximum of about five mW of power may be transmitted per longitudinal operating mode. Thus, to transmit a high power, such as one Watt, approximately two hundred longitudinal operating modes must be running. As previously discussed, the presence of a plurality of longitudinal operating modes can result in a number of operating problems, such as SBS and mode beating noise. The use of the MOPA configuration of the present invention provides control over the longitudinal operating modes such that the aforementioned problems may be alleviated or reduced in severity.

For example, as noted previously, to avoid SBS, the longitudinal operating modes should be spaced by at least 25 MHz. Oscillator cavity length may be determined according to the following expression: $\delta f = c/2nL$, where $\delta f$ is the mode separation, c is the speed of light, n is the index of refraction, and L is the oscillator cavity length. Accordingly, the cavity length L should be 4 meters or less to achieve a longitudinal mode spacing of 25 MHz or greater. If the mode locking noise is to be controlled above 500 MHz, in other words, if the mode spacing is to be at least 500 MHz, then the oscillator cavity length L must be 20 centimeters (cm) or less. If a round trip time above 1 GHz is desired, the cavity spacing must be 10 cm or less.

Thus, unlike the relatively long prior art cladding-pumped fiber lasers having a length typically in excess of 15 meters, the present invention uses a short oscillator cavity for mode control followed by a longer amplification section. As previously discussed, the short oscillator of the present invention improves laser performance in a number of ways, including increasing the range of operating wavelengths and decreasing the tendency for self mode-locking. Furthermore, light having a well-defined wavelength, as produced by the oscillators of the present invention, is typically required for Raman shifting near maximum efficiency.

A cladding-pumped MOPA laser structure, such as the laser structure 1a of FIGS. 1 and 2, operates as follows. As shown in FIG. 3, a suitable pump laser 30, such as a semiconductor diode laser having an operating wavelength range matching the absorption band of the active laser dopants, typically from 800 to 1000 nanometers, is optically coupled to the first cladding 5. The light from the pump laser 30 may enter the cladding 5 at a first end 20 of the laser structure, as shown in FIG. 3. This is referred to as "end-pumping." For an end pumped MOPA laser structure, such as laser structure 1a shown in FIG. 3, the oscillator 13a is preferably located near the pumped end of the laser structure. Alternatively, light from the pump laser 30 may enter the cladding 5 through the side of the fiber, referred to as "side-pumping," as described in U.S. Pat. No. 4,815,079, incorporated herein by reference. If the cladding pumped MOPA laser structure 1a is to be side-pumped, not shown in the Figures, the oscillator 13a is preferably situated between the point where light from the pump laser 30 is inserted into the laser structure 1a and the second end 21 of the laser structure 1a, preferably near the point of insertion.

Based on the geometry and refractive indices of the laser structure 1, light entering the first cladding 5 is absorbed by the core 3. The light then enters the oscillator 13a where light of a predetermined wavelength, defined by the structure of the index gratings 15a, 16a, is intensified in the oscillator. The predetermined wavelength is selected as a function of the absorption band of the active laser dopant. The index grating nearest the amplification section 18 of the fiber, such as index grating 16a in FIG. 2, functions as an output coupler since it is partially transmissive, having about a 98 percent reflectivity. The other index grating, 15a, is preferably substantially 100 percent reflective so that all light is reflected toward the index grating 16a. The light, intensified at the predetermined wavelength, exits the oscillator 13a and is amplified in the amplification section 18 of the fiber. In the amplification section, photons are absorbed by the active laser dopant, increasing its energy state and causing population inversion. As the dopant electrons decay to lower energy states, photons are emitted that have a wavelength characteristic of the dopant species.

Figure 4:
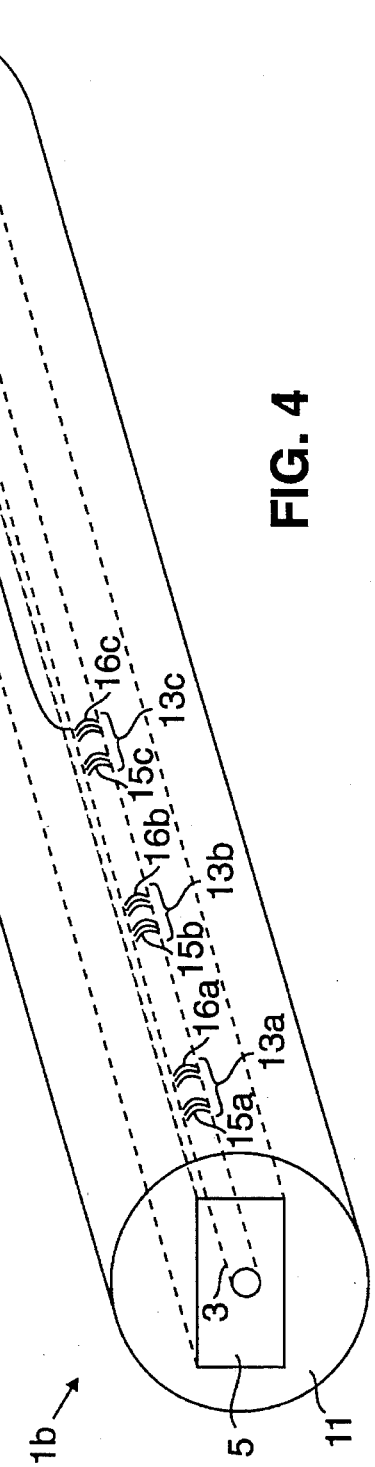
FIG. 4 is a second embodiment of a cladding-pumped MOPA laser structure according to the present invention.

In a second exemplary embodiment of a cladding-pumped MOPA laser structure 1b, shown in FIG. 4, the fiber core 3 contains three oscillators 13a, 13b and 13c. Each oscillator 13a–c intensifies light of a predetermined wavelength as a function of the design of the index gratings 15a–c and 16a–c, which predetermined wavelength may be different than that of some or all of the other oscillators. The light is then amplified in the amplification section 18 of the fiber core 3.

Laser structure 1b is particularly useful in optical communication applications such as wavelength-division-multiplexing. It should be understood that while three oscillators 13a–c are shown in FIG. 4, more or less oscillators may be present in other embodiments.

In a third embodiment of a cladding-pumped MOPA laser structure 1c, shown in FIG. 5, the fiber core 3 contains two oscillators 19a and 19b, defined by one broad band, 100 percent reflective index grating 17 defined in the core 3 near the end 20 of the laser structure, and two output coupler (less than 100 percent reflective) index gratings 16a and 16b spaced from the grating 17 in the core 3. The gratings 16a and 16b have the same design as like referenced gratings of embodiments 1a and 1b. Thus, they function as output couplers and are very wavelength selective. Preferably, the grating 16a reflects light of a different predetermined wavelength than the grating 16b. The broad band index grating 17 is designed to reflect light of several predetermined wavelengths. In particular, the index grating 17 is designed to reflect light having at least the same wavelengths as that reflected by the index gratings 16a and 16b. Thus, the broad band index grating 17, in conjunction with each narrow band index grating 16a, 16b, define two oscillators 19a, 19b, each intensifying light of a predetermined wavelength. It should be understood that while two oscillators 19a, 19b are shown in FIG. 5, more oscillators may be present in other embodiments.

The cladding-pumped MOPA laser structures 1a–1c may be formed in accordance with methods well known in the art. See, Senior, *Optical Fiber Communications: Principles and Practice*, (2d. ed., Prentice Hall, 1992), pp. 161–184. Briefly, a small core is formed inside a larger cladding using a vapor phase deposition method, such as modified chemical vapor deposition method. A preform is created therefrom, the preform having a much larger diameter than the finished fiber. Next, the preform is milled so it has rectangular cross section. The preform is then pulled through a polymer cup wherein the cladding is coated with a fluoropolymer coating, which forms the second cladding 11 upon UV exposure. The second cladding 11 has a lower refractive index than the first cladding layer and therefore provides a confinement layer for radiation propagating within the first cladding 5. The preform is then drawn through a furnace to form the fiber.

After the fiber is formed, the second cladding is stripped from the fiber at the sites where index gratings will be formed. Index gratings are then formed in the fiber core 3 via a UV light-induced refractive index change that varies periodically along the fiber core 3 axis. After forming the gratings, the fluoropolymer coating is then reapplied to the cladding 5 at the appropriate sites.

The core 3 must be doped with Ge or P to form gratings via UV light exposure. Exposing the doped core 3 to UV light creates defects, e.g., Ge-oxides or P-oxides, which raise the index of refraction of the region where the defect exists. UV light having a wavelength of 242 nanometers (nm) is used for patterning Ge doped fibers and UV light having a wavelength of 193 nm is used for patterning P doped fibers. To create the defects in a regular pattern necessary for forming the index gratings 15a–c, 16a–c, or 17, an interferometer is used. In particular, an interference pattern of alternating dark and light bands is projected on the core 3. Index changes occur in the core 3 where the light bands appear. Preferably, a phase mask is used to produce the interference pattern, and this controls the period of the grating which is created in the fiber core 3. See Erdogan and Mizrahi, "Fiber Phase Gratings Reflect Advances in Lightwave Technology," *Laser Focus World*, (February 1994).

It should be understood that the embodiments described herein are illustrative of the principles of this invention and that various modifications may occur to, and be implemented by, those skilled in the art without departing from the scope and spirit of the invention.

I claim:

1. A master oscillator and power amplifier configuration for a high power cladding-pumped laser structure which operates with a plurality of longitudinal modes having a desired mode spacing, comprising:

a single mode core doped with ionized rare earth elements and with refractive-index modifying dopants;

a first oscillator defined in the single mode core, wherein the first oscillator is defined by two spaced index gratings, the space between the two index gratings defining an oscillator cavity length;

a first cladding surrounding the single mode core; and a second cladding surrounding the first cladding, wherein the oscillator cavity length is determined by the desired mode spacing and is less than one-half of the single mode core length, thereby providing independent control layer the longitudinal modes.

2. The master oscillator and power amplifier configuration of claim 1 wherein the ionized rare earth elements are selected from the group consisting of $Nd^{3+}$, $Yb^{3+}$ and $Tm^{3+}$.

3. The master oscillator and power amplifier configuration of claim 1 wherein the refractive-index modifying dopants are selected from the group consisting of $GeO_2$, $GeCl_4$, $P_2O_5$ and $Al_2O_5$.

4. The master oscillator and power amplifier configuration of claim 1 wherein the first cladding has a rectangular cross section, the rectangular cross section having long sides and short sides, the ratio of the long sides to the short sides being in the range of about 1.5/1 to 10/1.

5. The master oscillator and power amplifier configuration of claim 1 wherein the first cladding has a rectangular cross section, the rectangular cross section having long sides and short sides, the ratio of the long sides to the short sides being about 3/1.

6. The master oscillator and power amplifier configuration of claim 1 wherein the single mode core has a refractive index of about 1.465, the first cladding has a refractive index of about 1.46, and the second cladding has a refractive index having a maximum value of about 1.38.

7. The master oscillator and power amplifier configuration of claim 1 further comprising a plurality of oscillators for intensifying light of a predetermined wavelength, wherein the predetermined wavelength is different for at least two of the plurality of oscillators.

8. The master oscillator and power amplifier configuration of claim 1 comprising a plurality of oscillators, and wherein the plurality of oscillators are defined by one broad band index grating that is substantially completely reflective and a plurality of narrow band index gratings that are partially transmissive.

9. The master oscillator and power amplifier configuration of claim 1 wherein a light source is optically coupled to the first cladding.

10. The master oscillator and power amplifier configuration of claim 9 wherein the light source is a high power diode laser.

11. The master oscillator and power amplifier configuration of claim 10 wherein the high power diode laser has an operating wavelength between about 800 and 1000 nanometers.

12. The master oscillator and power amplifier configuration of claim 1 wherein the desired mode spacing is sufficient to avoid Stimulated Brillioun Scattering.

13. The master oscillator and power amplifier configuration of claim 1 wherein the desired mode spacing is at least about 25 mega Hertz.

14. The master oscillator and power amplifier configuration of claim 1 wherein the desired mode spacing is at least about 500 mega Hertz.

15. The master oscillator and power amplifier configuration of claim 1 wherein the desired mode spacing is at least about 1 giga Hertz.

16. A master oscillator and power amplifier configuration for a high power cladding-pumped laser structure which operates with a plurality of longitudinal modes having a desired mode spacing, comprising:

a single mode core doped with ionized rare earth elements and with refractive-index modifying dopants;

a first oscillator defined in the single mode core, wherein the first oscillator is defined by two spaced index gratings, the space between the two index gratings defining an oscillator cavity length;

a first cladding surrounding the single mode core;

a second cladding surrounding the first cladding; and a light source optically coupled to the first cladding, wherein the oscillator cavity length is determined by the desired mode spacing and is less than one-half of the single mode core length, thereby providing independent control over the longitudinal modes.

17. The master oscillator and power amplifier configuration of claim 15 wherein the light source is a high power diode laser.

18. A method of making a master oscillator and power amplifier cladding-pumped laser structure, where the laser structure, in operation, has a plurality of longitudinal modes running, the longitudinal modes having a desired mode spacing, comprising the steps of:

(a) forming a core inside a cladding, wherein the core is doped with ionized rare earth elements and index-modifying dopants and (b) forming at least two index gratings in the core, wherein the index gratings are spaced to achieve the desired mode spacing, wherein the space between the two index gratings defines an oscillator cavity length, which length is determined by the desired mode spacing and is less than one-half of the core length, thereby providing independent control over the longitudinal modes.

19. The method of claim 18 wherein the step of forming at least two index gratings in the core comprises causing a ultraviolet light-induced refractive index change at at least two spaced locations in the core, which refractive index change varies periodically along the core.

20. The method of claim 19 wherein the periodic variation is created by projecting an interference pattern on the core.

* * * * *